Patented Jan. 15, 1935

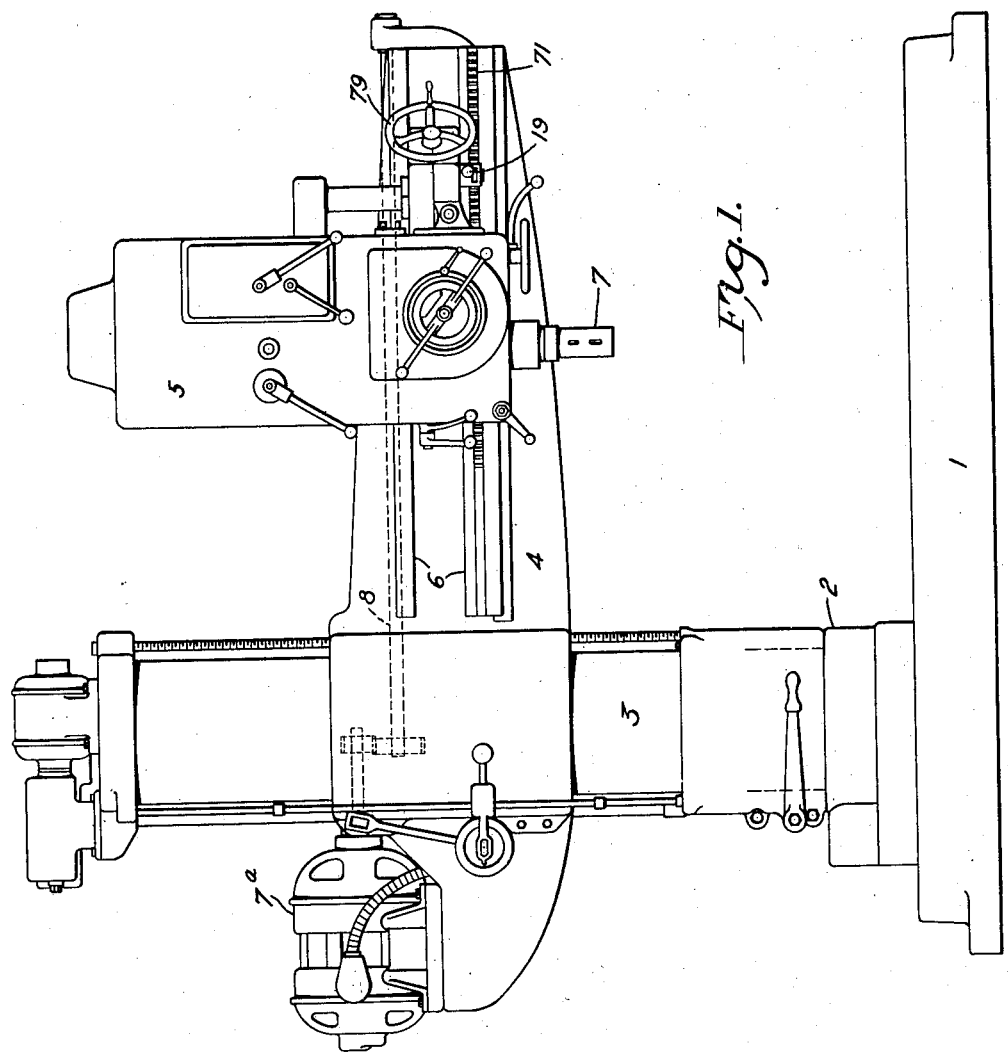

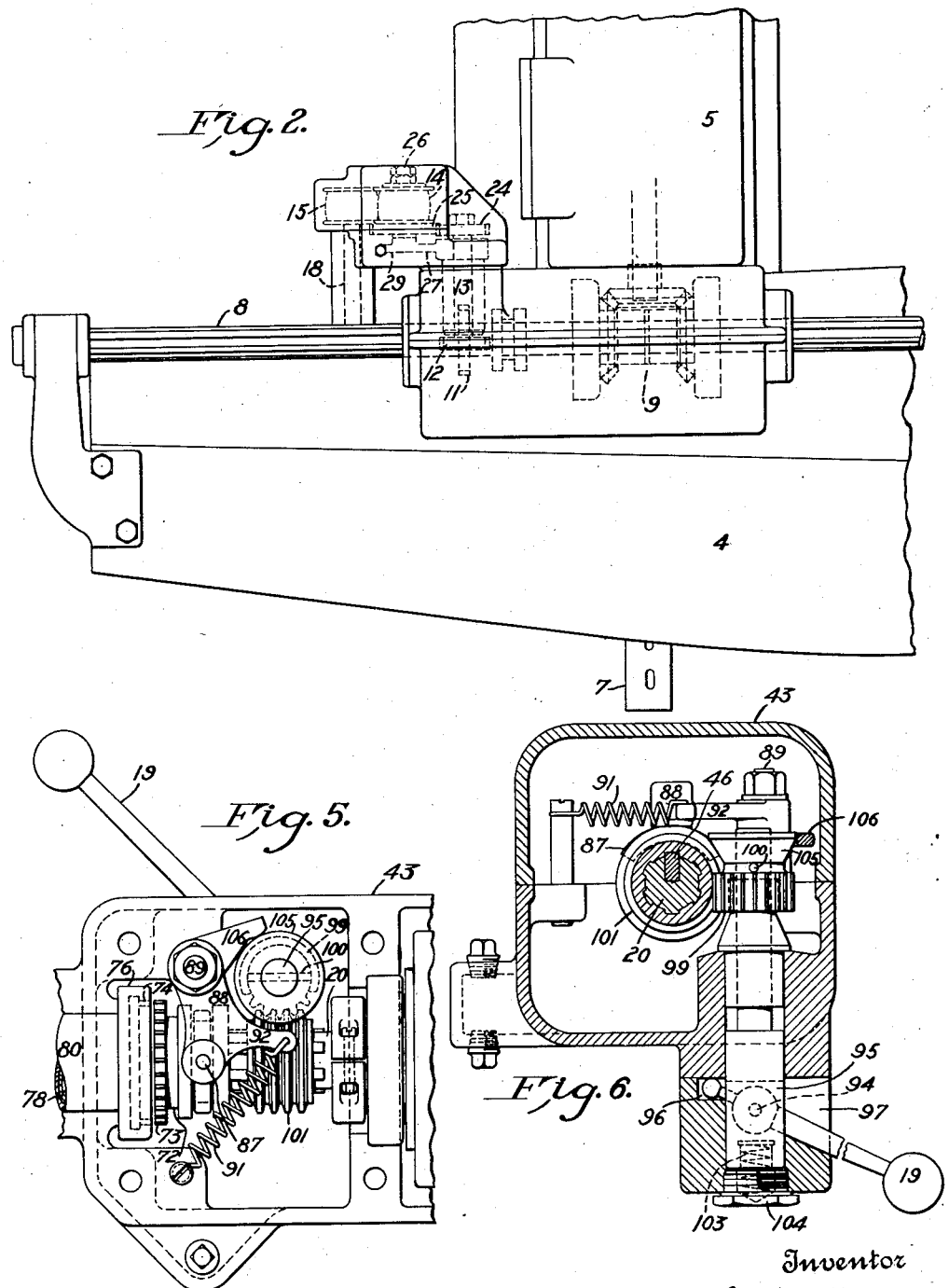

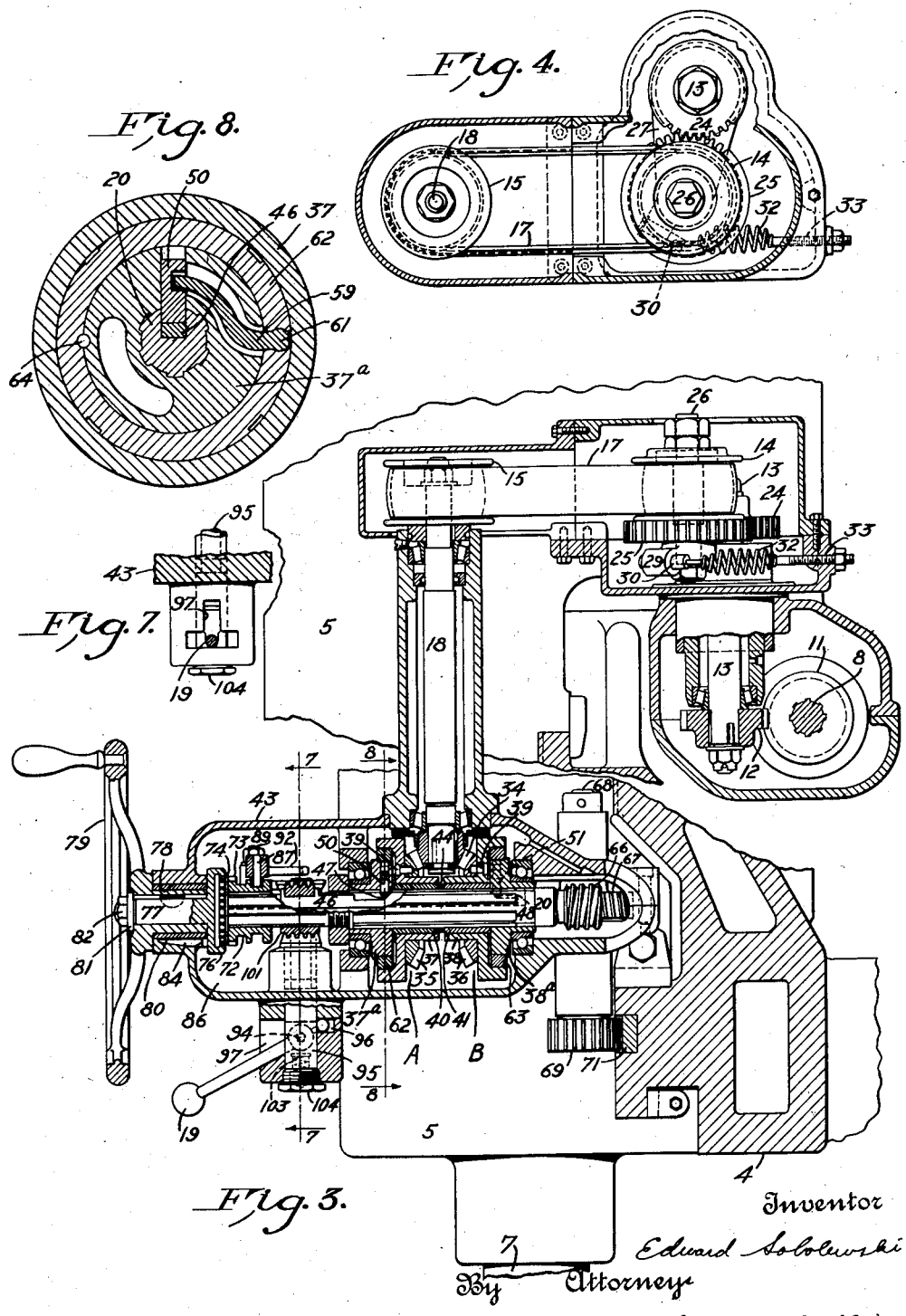

1,987,979

UNITED STATES PATENT OFFICE 1,987,979

SAFETY POWER TRAVERSE FOR RADIAL DRILL HEADS

Edward Sobolewski, Cincinnati, Ohio, assignor to The Cincinnati Bickford Tool Company, Cincinnati, Ohio, a corporation of Ohio Application February 10, 1931, Serial No. 514,739

11 Claims. (Cl. 77—28)

This invention relates to power transmission mechanisms for machine tools and primarily to a means for automatically releasing or suspending the drive to a driven element whenever the driven element of the organization is obstructed in its movement or encounters a resistance greater than normal.

It has for its main object to provide a means for rendering the power transmission ineffective as a propelling medium whenever the shiftable or movable element of the machine tool reaches its limit of travel and/or at any point within the permissible range of movement should its travel be obstructed for any reason.

A further object of this invention is to provide a machine tool having both power means and manual means for moving an element thereof in either direction and provided with a single interlocked control lever so constructed and arranged that movement of the lever in one direction connects the power means and effects a movement of the part in the same direction, while movement of the lever in another direction effects a movement of the part in that direction and when the directional control lever is released entirely the power means is automatically disconnected and the elements repositioned for effecting a movement of the part manually.

Still another object of this invention is to construct a machine tool organization with both power and manual means for propelling an element thereof, and to provide a single interlocked controller arranged in a manner whereby either transmission mechanism may be rendered effective separately, but not simultaneously, and in combination therewith a load discriminator in the power drive means for rendering the power transmission ineffective in emergencies even though the operator does not declutch the power drive.

A machine tool such as the radial drill herein illustrated may be used to illustrate a practical application of this invention, but it is to be understood that it is not limited to use on radial drills only, and that other applications and uses are contemplated.

In the case of a radial drill, in order to spot or position the drill in approximately the correct location the operator swings the arm around and translates the spindle head along the arm until the tool is in the approximate position required. The movement of the head along the arm is usually accomplished by power, the final positioning of the tool being effected by hand through the use of a customary drive such as a rack and pinion. However, should the operator, inadvertently, permit translation of the tool carrier to continue under power until the head strikes against abutments, usually located at either extreme of the radial arm, there is unavoidable jarring and straining of the parts and not infrequently breakage to portions of the frame or to the transmission parts. Similarly, should the translatory movement of the head become obstructed for any other reason, such as for example, encountering a portion of the work-piece, jig, or fixture or by a clogging of the armways there is always the danger of breakage or undue stressing of the transmission parts before the operator has time to disconnect the power.

This invention proposes to overcome these objectionable features, by providing a safety means in the power drive for interrupting the drive and relieving the recurrent stresses upon the transmission members whenever the tool-carrier encounters an obstruction having a resisting force greater than the forces encountered during the normal operation of the machine.

In carrying out the objects of this invention it is proposed to transmit power from a prime mover to the traversing mechanism by means of a belt and pulley arrangement, the axis of the driven pulley being fixed with relation to its associated mechanism and the axis of the driving pulley adjustable about a center offset from a line intersecting the axes of both pulleys. Resilient means are provided of a strength sufficient to keep the belt taut, for moving the driving pulley away from the driven pulley and thus maintain a driving relation under normal loads. So soon as the load is increased beyond a predetermined value, as by the drill head or tool encountering an obstruction, the driving pulley is caused to creep toward the driven pulley, shortening the gap and allowing the belt to slip. When the obstruction is removed and the load decreased, the power drive automatically responds and continues to move the drill head until the hand control lever is released.

A manually operated control lever is provided to engage and disengage both the power and hand traversing mechanisms as well as to actuate reversing mechanisms connected with the power drive mechanism. The traverse lever is urged to a neutral position by a spring whereby the operator must continually keep his hand thereon in order to maintain the power drive effective, the moment the lever is released, the power driving clutches are again returned to neutral and the power drive is disconnected.

In order to permit the hand wheel for the manual traversing means to remain stationary while the tool carrier is translated by power, the controller is interlocked with a shiftable selector clutch element and adapted automatically to disengage the hand traversing means whenever the operator throws in the power traversing means. Conversely, when the controller element is moved to neutral position, or merely released by the operator, the power driving means is disengaged and the manual means automatically reengaged for effecting movement of the shiftable element by hand.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a side elevation of a radial drilling machine depicting a preferred embodiment of this invention. Fig. 2 is a rear view of a portion of a radial drilling machine illustrating the power shaft with the drive connections to the head and to the safety power traverse mechanism for translating the head along the arm. Fig. 3 is a sectional view, partially developed, better to illustrate the power traversing mechanism for the drill head and illustrating the motion reversing means, and the interlock between the manual and power traversing mechanisms. Fig. 4 is a plan view of part of the power traverse transmission. Fig. 5 is a fragmentary plan view of the selector clutch actuating means. Fig. 6 is a sectional view along the line 7—7 of Fig. 3, showing the directional control lever and portions of its associated mechanism. Fig. 7 is a detail view of the controller guide, showing the inverted T-slot for guiding the lever. Fig. 8 is a sectional view of one of the reversing clutches, taken along the line 8—8 of Fig. 3.

Referring more particularly to Fig. 1 of the drawings, the invention is disclosed as embodied on a representative type of machine tool, such as a radial drill. Tools of this character are usually provided with a base 1, a column 2 and a sleeve 3 upon which is mounted for vertical movement a radially disposed arm 4. Translatably mounted upon ways 6 of the arm is the usual drill head 5 within which the customary feed and speed gears for translating and rotating the spindle 7, are journaled. A suitable prime mover, such as a motor 7ª furnishes the power which rotates an arm shaft 8, preferably at a constant speed and in one direction only. The drive to the spindle is taken from the shaft 8 by a suitable reversible clutch transmission 9, having a splined connection with the main shaft.

In this application of this invention the power for traversing the head along the arm-ways is preferably taken directly from the arm shaft 8, although it may be taken from the gearing within the head or have an entirely independent drive such as that provided by an auxiliary motor.

Gears 11 and 12 transmit the motion of the arm shaft to a stub shaft 13 upon which is mounted a gear 24 constantly in mesh with a laterally movable gear 25 journaled at one end of an arm 27. The other end of the arm 27 is pivotally supported concentric with the axis of the gear 24 and shaft 13 and, regardless of the angular position of the rock arm 27, the gear 25 is constantly being driven. One side of the gear 25 carries a flanged pulley 14 which transmits motion by means of a belt 17 to a second pulley 15 and shaft 18 and thence to the traversing mechanism.

In order to keep the belt tight under normal conditions an arm 29 of the bracket 27, carries a stud 30 which is connected, by a spring 32, to one wall of the casing or housing. With the gear 24 running counterclockwise, as viewed in Fig. 4, the pressure angle between the mating gears is in a direction tending to move the axis of the driving gear 25 and pulley 14 away from the axis of the driven pulley 15 and thus also tending to keep the belt taut and maintain the driving relation. However, if the movement of the shaft 18 or parts connected therewith be constrained for any reason beyond a normal value the driving pulley will thereupon be caused to creep toward pulley 15. As soon as this pulley starts to move toward the driven pulley, the belt is loosened which permits the driving pulley 14 to slip within the belt, and thereby release the strain of a continued application of power upon the restrained transmission. An adjusting screw 33 is provided for varying the characteristics of the spring 32 to vary the permissible load allowable before slipping action takes place.

Keyed to the lower end of the driven shaft 18 is a bevel gear 34 which is constantly in mesh with the two bevel gears 35 and 36 that are secured respectively to clutch cups 37 and 38 by bolts 39. The cups are preferably mounted upon bushings 40 and 41 respectively, separated from each other by a washer 44, and are thereby freely rotatable upon shaft 20 which is journaled in suitable bearings in the frame or housing 43. Slidably mounted within a groove formed in shaft 20 and actuated by a hand control lever 19 is a spreader cam 46 having cam surfaces 47 and 48. Complemental clutch discs 37ª and 38ª, splined to the shaft 20, selectively transmit rotary movement of the gears 35 and 36 to the shaft 20 as will now be explained.

Movement of the rod 46 to the left causes the cam surface 47 to elevate the pin 50 and to thus rock clutch lever 59 and expand the clutch ring 62. The opposite ends of the clutch levers 59 are fitted with enlarged rounded portions 61 adapted to engage complementally shaped end surfaces of the split ends of the clutch rings which are secured to the clutch discs 37ª and 38ª by suitable keys 64 positioned intermediate the ends of the rings. With the clutch spreader key 46 moved to the left, clutch member B is disengaged and the pin 51 rests on the low portion of the cam bar 46. The converse is true when the cam bar is moved to the right, clutch A is released and clutch B engaged and the movement of the head is reversed. In Fig. 3, the spreader key 46 is shown in a position wherein both of its cam surfaces 47 and 48 are but slightly engaged with the pins 50 and 51, and both pins have been moved inwardly due to the contraction of the rings 62 and 63. In this neutral position neither of the clutch elements A nor B are engaged, and therefore, the power drive is discontinued.

The before mentioned rack and gear connection between the drill head and radial arm comprises a worm 66 keyed to the shaft 20 and adapted to engage a worm wheel 67, secured to a short shaft 68 which is journaled in bearings in the head 5. The shaft 68 also carries a pinion gear 69 in mesh with a rack 71 formed on the arm 4, and thus rotation of the shaft 20 effects a movement of the head along the arm in either direction depending, however, upon the direction that the shaft 20 is driven.

As an aid in accurately locating the cutting tool, means are provided for translating the head by hand, in place of by power, and in order that the two mechanisms will not be operative simultaneously, the following interlocking mechanism is employed, and illustrated more particularly by Figs. 3, 5, 6 and 7.

Splined to the shaft 20 is a shiftable clutch spool 72 containing clutch teeth 73 adapted to engage clutch teeth 74 formed upon a flanged portion 76 of a short shaft 77 which is keyed to the hub 78 of a hand wheel 79. The hub 78 is rotatably mounted within a suitable bushing 80 seated in the housing 43, and held against end movement by the flanged portion of the clutch member 76 and a washer 81 and a nut 82. An oil chamber 84 is provided to connect with an oil reservoir 86 to insure proper lubrication.

The clutch spool 72 is shiftable by fork 87 secured to a two armed lever 88 which is fulcrumed at 89 within the housing. A spring 91, secured to an arm 92 of the shifting lever, urges the lever and selector 72 toward the left (Fig. 5) to keep the clutch teeth 73 engaged with the clutch teeth 74. A second arm 106 of the shifting lever engages a cam surface 106 formed integral with a gear 99 which is mounted for axial movement as well as rotary movement in suitable bearings provided by the frame 43. The gear 99 has a toothed connection with a circular rack cut on a spool 101 to which is connected the cam bar 46 that controls the actuation of the reversing clutches A or B. Thus rotary movement of the gear 99 translates the bar 46 and effects a translation of the head by power, whereas axial movement of the gear 99 oscillates the selector lever 88 to render the manual means effective or ineffective as the case may be.

So that it will be impossible to have both transmissions effective simultaneously, a single control lever 19 is provided which controls the shifting of the above described elements in a definite predetermined cycle, as follows. The pinion 99 and cam 105 is secured by pin 100 to a shaft 95, journaled in the housing, and has at its lower end a pivotal connection 94 with the control lever 19. One end of the control lever is fulcrumed in a slot 96 and the other end projects thru an inverted T slot 97 which controls or defines the path of movement of the controller 19. Thus, when the lever 19 is "down" it may be moved to either right or left which oscillates the gear 99 and effects operation of one of the reversing clutches A or B. At this time the gear 99 is also "down" and the cam surface 105 has moved lever 88 counterclockwise which disengages clutch elements 73 and 74 of the manual traversing means.

To engage the hand traverse mechanism, lever 19 must first be brought to a position intermediate the ends of the T-slot 97, returning clutches A or B to neutral, and then moved upwardly. Upward movement of the lever effects a corresponding movement of the cam 105 and allows lever 106 to move inwardly (clockwise) and thus effect an engagement of the clutch elements 73 and 74 of the manual traverse means. The upper faces of the T-slot are slightly tapered upwardly toward the center so that spring 103 in conjunction with the spring 91 as well as the equalizing action of the clutch rings 62 and 63 on cam surfaces 47 and 48 of the bar 46, tend to return the lever 19 to neutral immediately upon the release thereof by the operator. These movements as heretofore explained, automatically place the power traverse clutches in neutral and engages the manual means whenever the operator releases his grip on the control lever.

Combined with the interlocking mechanism just described is the load discriminating mechanism in the power traverse transmission, effective to suspend the drive whenever the tool head or parts carried thereby encounters an obstruction, even though the operator retains his grasp upon the control lever and endeavors to move the head further by power. Obviously such safety measures are not required in the manual traverse train because when that is employed the rate of travel is much slower and the operator can "feel" the additional load the instant it is encountered and consequently stop the rotation of the hand wheel.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. A radial drill, combining a column; an arm translatably mounted thereon; a tool carrier slidably mounted on said arm; manual and power driving means for translating said carrier along said arm; means located in said power driving train, effective to interrupt the power drive to the carrier whenever the resistance to carrier movement exceeds a predetermined value said means comprising a fixed and a movable pulley and a driving connection therebetween, said movable pulley being mounted for movement toward or away from the fixed pulley, means normally tending to move said movable pulley away from the fixed pulley thereby to maintain said driving connection effective to transmit a predetermined maximum torque, and means for varying the degree of effectiveness of said driving connection; reversing mechanism for said power drive means; a selector clutch for rendering either of said drive means effective; a controller for said selector clutch and interlocked with said reversing mechanism; and means for suspending the operation of one of said traversing mechanisms upon the release of said controller.

2. A radial drill, combining a column; an arm translatably mounted thereon; a tool carrier slidably mounted on said arm; manual and impositive power driving means for translating said carrier along said arm; means located in said power drive means, including a load discriminator automatically effective to cause the power drive to the carrier to slip whenever the resistance to carrier movement exceeds a predetermined value; means for varying the unit value of the resistance required to effect slippage of said impositive drive means; reversing mechanism for said power drive means; clutch means for rendering either of said drive means effective; a controller for said clutch means and interlocked with said reversing mechanism for rendering the manual driving means effective upon the release of the said controller.

3. A machine tool combining, a support; a carrier translatably mounted thereon; power transmission means, including reversing mechanism for translating said carrier along said support in either direction; independent manual means for shifting said carrier along said support; interlocking control means for said translating mechanisms arranged to render one of said translating means ineffective when said other translating means is effective; means for effecting slippage of said power transmission whenever the load on said transmission exceeds a predetermined maximum in effecting translation of said carrier; and means for varying the maximum torque load required in said power transmission to render said transmission ineffective to translate said carrier.

4. A machine tool combining a support; a carrier translatably mounted thereupon; power means for traversing said carrier upon said support including a driving and a driven element with a flexible driving connection therebetween, said elements being adapted for movement relative to each other thereby to vary the effectiveness of said driving connection, resilient means normally tending to maintain said driving connection effective to transmit a predetermined torque; manual means for traversing said carrier upon said support; control means for rendering either of said traversing means effective; and means for varying the value of the torque transmitted by said power means thereby to suspend translatory movement of said carrier when the movement thereof is opposed by a resistance in excess of a predetermined value.

5. A machine tool combining a support, a carrier translatably mounted on said support; power transmission means for translating said carrier on said support; variable means for rendering the action of said power transmission means ineffective as a translating medium whenever movement of said carrier is resisted by a force in excess of a predetermined value; and means for varying the maximum value of the force required to render said transmission ineffective as a translating medium.

6. In a machine tool the combination of an element adapted to be moved; impositive power driving means for moving said element, comprising a fixed and a movable pulley having a belt connection therebetween, an angularly movable supporting bracket for the movable pulley, a driving and a driven gear mounted upon said bracket and connected with the pulley for transmitting motion to the pulley in any angular position of said bracket and means acting in a direction substantially parallel to the line of movement of the movable pulley with respect to the fixed pulley normally tending to maintain said driving connection operative; and means for varying the effective action of said last mentioned means.

7. A drilling machine combining a support, a carrier translatably mounted on said support, power means for propelling said carrier on said support, means for rendering said power means ineffective to translate said carrier whenever movement of said carrier is obstructed, comprising a driven element and a driving element and a flexible driving connection therebetween, said elements being relatively movable thereby to vary the effectiveness of said driving connection; spring means normally tending to move one of said elements to a position rendering the driving connection effective; and means for varying the characteristics of said spring.

8. In a radial drill having an arm and a tool head translatably mounted thereon, said tool head being variable in weight, translating means for said head comprising a power shaft, a rack-bar extending lengthwise of said arm, a pinion meshing with said rack-bar, a driving connection between said power shaft and said pinion comprising a first driven shaft journaled in said tool head and rotated from said power shaft, a second driven shaft journaled in said tool head parallel with said first driven shaft; a driving connection between said second driven shaft and said pinion; a driven pulley secured upon said second driven shaft; a swinging arm journaled coaxial with said first driven shaft, a gear and a driving pulley journaled on said swinging arm; a gear secured to said first driven shaft meshing with the first mentioned gear to rotate it and said driving pulley, a belt connection between said driving and driven pulleys, and means normally tending to shift said swinging arm to separate said driving and driven pulleys thereby to establish and maintain a driving connection with said belt sufficient to cause it to transmit to said second driven shaft power of a predetermined value only slightly in excess of the amount required to translate said tool head, said swinging arm being adapted to swing toward the driven pulley thereby to render said driving connection ineffective when said predetermined value is reached.

9. In a radial drill having an arm and a tool head translatably mounted thereon, said tool head being variable in weight, translating means for said head comprising a power shaft, a rack-bar extending lengthwise of said arm, a pinion meshing with said rack-bar, a driving connection between said power shaft and said pinion comprising a first driven shaft journaled in said tool head and rotated from said power shaft, a second driven shaft journaled in said tool head parallel with said first driven shaft; a driving connection between said second driven shaft and said pinion; a driven pulley secured upon said second driven shaft; a swinging arm journaled coaxial with said first driven shaft, a gear and a driving pulley journaled on said swinging arm; a gear secured to said first driven shaft meshing with the first mentioned gear to rotate it and said driving pulley, a belt connection between said driving and driven pulleys, and an adjustable spring connected to shift said swinging arm to separate said driving and driven pulleys thereby to establish and maintain a driving connection with said belt sufficiently effective to transmit to said second driven shaft power of a predetermined value only slightly in excess of the amount required to translate said tool head, said driving pulley being arranged to creep back on the diving side of the belt and reduce the distance between the pulleys thereby to cause the drive to become ineffective when said predetermined value is reached.

10. In a radial drill having an arm and a tool head translatably mounted thereon, said tool head being variable in weight, translating means for said head comprising a power shaft, a rack-bar extending lengthwise of said arm, a pinion meshing with said rack-bar, a transmission between said power shaft and said pinion comprising a first driven shaft journaled in said tool head and rotated from said power shaft, a second driven shaft journaled in said tool head parallel with said first driven shaft; a driving connection between said second driven shaft and said pinion; a driven pulley secured upon said second driven shaft; a swinging arm journaled coaxial with said first driven shaft, a gear and a driving pulley journaled on said swinging arm; a gear secured to said first driven shaft meshing with the first mentioned gear to rotate it and said driving pulley, a belt connection between said driving and driven pulleys, a housing carried by said tool head enclosing said transmission, a spring located within said housing and acting on said swinging arm to separate said driving and driven pulleys thereby to establish and maintain a driving connection with said belt sufficiently effective to cause it to transmit to said second driven shaft power of a predetermined value only slightly in excess of the amount required to translate said tool head and then to slip, said swinging arm being adapted to swing toward the driven pulley thereby to render said driving connection ineffective when said predetermined value is reached, and means located exteriorly of said housing to vary the effectiveness of said spring in accordance with the load on said transmission.

11. In a machine tool having an element adapted to be translated, a power shaft, a driving transmission between said power shaft and said translatable element to translate the latter, said transmission being constructed and arranged selectively to transmit power at any one of a plurality of predetermined maximum values and comprising an adjustably mounted driving pulley driven from said power shaft, a driven pulley connected to translate said element, a belt connection between said driving and driven pulleys, adjustable means to vary the effectiveness of said transmission in accordance with the power required to translate said element; and means adapted to shift said driving pulley relative to the driven pulley thereby to render said transmission ineffective when the power required to translate said element exceeds a preselected one of said predetermined values.

EDWARD SOBOLEWSKI.